(12) United States Patent
Ito et al.

(10) Patent No.: US 6,248,915 B1
(45) Date of Patent: Jun. 19, 2001

(54) METHOD OF PRODUCING REACTIVE SILICON GROUP-CONTAINING POLYETHER OLIGOMERS

(75) Inventors: Hiroshi Ito; Hidetoshi Odaka, both of Takasago; Hideharu Jyono, Kobe; Hiroshi Iwakiri, Kobe; Fumio Kawakubo, Kobe, all of (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/472,962

(22) Filed: Dec. 28, 1999

(30) Foreign Application Priority Data

Jan. 5, 1999 (JP) .................................................. 11-000644

(51) Int. Cl.$^7$ ....................................................... C07F 7/08
(52) U.S. Cl. .............................. 556/445; 528/15; 528/25; 528/29
(58) Field of Search ............................... 556/445; 528/15, 528/25, 29

(56) References Cited

U.S. PATENT DOCUMENTS

| | | | |
|---|---|---|---|
| 4,788,254 | 11/1988 | Kawakubo et al. | 525/100 |
| 5,773,484 | * 6/1998 | Miller | 556/445 X |
| 5,981,613 | * 11/1999 | Cobb et al. | 528/25 |
| 5,986,122 | * 11/1999 | Lewis et al. | 556/445 |

FOREIGN PATENT DOCUMENTS 0 693 513 A2  1/1996  (EP) .

\* cited by examiner

*Primary Examiner*—Paul F. Shaver
(74) *Attorney, Agent, or Firm*—Connolly Bove Lodge & Hutz

(57) ABSTRACT

The invention provides a method of producing a reactive silicon group-containing polyether oligomer which comprises reacting (a) a polyether oligomer having main chain of a polyether and, in each molecule, at least one unsaturated group represented by the general formula (1):

$$H_2C=C(R^1)-R^2-O- \qquad (1)$$

(in the formula, $R^1$ is a hydrocarbon group containing not more than 10 carbon atoms and $R^2$ is a divalent organic group containing 1 to 20 carbon atoms and one or more species selected from the group consisting of hydrogen, oxygen and nitrogen atoms as a constituent atom) or the general formula (2):

$$HC(R^1)=CH-R^2-O- \qquad (2)$$

on a side chain or at a terminus with (b) a reactive silicon group-containing compound in the presence of (c) a group VIII transition metal catalyst to introduce the reactive silicon group into said polyether oligomer (a), wherein the reaction is carried out in the presence of (d) a sulfur compound.

20 Claims, No Drawings

METHOD OF PRODUCING REACTIVE SILICON GROUP-CONTAINING POLYETHER OLIGOMERS

FIELD OF THE INVENTION

The present invention relates to a novel, reactive silicon group-containing polyether oligomer and a method of producing the same. More particularly, it relates to a polyether oligomer containing a reactive silicon group within the molecule which is prepared by hydrosilylation of an unsaturated group-containing compound with a reactive silicon group-containing compound and to a method of producing the same.

PRIOR ART

Methods of producing reactive silicon group-containing polyether oligomers which comprise reacting an unsaturated group-containing polyether oligomer with a reactive silicon group-containing compound in the presence of a group VIII transition metal catalyst such as chloroplatinic acid have been disclosed (Japanese Kokoku Publications Sho-45-36319, Sho-46-12154, Sho-48-36960, Sho-58-41291, Sho-63-37820). However, in the hydrosilylation reaction between an unsaturated group and a reactive silicon-containing compound, a polyether oligomer having an allyl group as the unsaturated group undergoes a side reaction, namely the allyl group undergoes internal rearrangement to give a propenyl group, so that the reaction yield of the reactive silicon group relative to the unsaturated group has its limit.

Further, one of the main problems known to the people in the technical field where the hydrosilylation reaction is utilized is that, under the respective reaction conditions, the rate of reaction falls or the activity of the catalyst used in the reaction decreases during reaction, or the reaction stops. Thereby, in certain cases, not only the time required for the reaction is prolonged but also, the side reaction percentage relatively increases, leading to decreases in selectivity toward the desired hydrosilylation reaction. Even when the rate of reaction is increased by increasing the amount of an expensive metal catalyst, the amount of the catalyst remaining in the reaction product increases and this is unfavorable to the subsequent use in certain instances. (In the case of hydrosilylation of a high molecular polymer, for example, there is the problem that the catalyst-derived black powder is difficult to remove, hence the product becomes blackly muddy.) In case of deactivation of a platinum catalyst, as reported by A. Onopchenko et al. (J. Org. Chem., 52, 4118 (1987)) and L. N. Lewis et al. (J. Am. Chem. Soc., 112, 5998 (1990)) and in Japanese Kokai Publication Hei-5-213972, there is the method available which comprises using oxygen for reactivating the catalyst (Japanese Kokai Publication Hei-8-283339). As for the addition of a substance capable of effectively accelerating the reaction, there have been proposed methods which comprise adding an acetylene alcohol (Japanese Kokai Publication Hei-8-231563), an unsaturated secondary or tertiary alcohol (Japanese Kokai Publication Hei-8-291181), a tertiary alcohol (Japanese Kokai Publication Hei-8-333373), an unsaturated ketone (Japanese Kokai Publication Hei-8-208838) or an ene-yne unsaturated compound (Japanese Kokai Publication Hei-9-25281), for instance.

The course of the hydrosilylation reaction is influenced by respective reactants and reaction conditions. In particular, the reactivity is apt to decrease when the unsaturated compound is a high-molecular polymer, when the concentration of the unsaturated group is low, when the viscosity of the reaction mixture is high, when an internal olefin is used-which is lower in hydrosilylation reactivity than the corresponding terminal olefin, or when the reactants and/or solvent contains a reaction inhibitor.

In such a system in which a decrease in reactivity is encountered, the side reaction percentage increases and the hydrosilylation percentage decreases as the reaction time is prolonged. The hydrosilylation reaction by which a hydrolyzable silyl group is introduced into a high-molecular polymer is important as practical means for synthesizing high-molecular polymers capable of being crosslinked by silanol condensation. As the hydrosilylation percentage of such high-molecular polymers decreases, the crosslink density decreases, hence the physical properties of the crosslinked products are affected, for example the strength decreases. For increasing the reaction yield, it is necessary to increase the amount of the expensive noble metal catalyst or silicon compound; this is unfavorable from the economical viewpoint. The methods of promoting the hydrosilylation reaction which have so far been contrived cannot always bring about a satisfactory solution to such a problem.

The present invention is to provide a novel method of promoting the hydrosilylation reaction more efficiently.

SUMMARY OF THE INVENTION

In an attempt to improve the reaction yield, relative to the unsaturated group, of the reactive silicon group, the present inventors made intensive investigations and it was surprisingly found that, when a polyether oligomer which contains an unsaturated group having a certain specific structure and can be produced with ease is used, a polyether oligomer containing a reactive silicon group with an markedly improved rate of reactive silicon group introduction relative to the unsaturated group, namely not less than 85% on average, can be obtained while the side reaction of the unsaturated group during the hydrosilylation reaction is suppressed, and that said hydrosilylation reaction is promoted in the presence of a sulfur compound. It is generally recognized that sulfur compounds inhibit the catalytic activity of metals, so that, in the prior art, the hydrosilylation conditions are selected so as to exclude sulfur compounds to the utmost. The use of a sulfur compound in accordance with the present invention, which is quite unexpected in view of the prior art general conception, is novel and has an important practical effect. It was further found that the polyether oligomer having a reactive silicon group introduced at not less than 85%, on average, of each molecular terminus can give cured products definitely superior in physical properties to those obtained from the polyether oligomers which have so far been used and have a reactive silicon group introduction percentage of at most 80%, on average, of each molecule terminus.

Thus, the first aspect of the present invention relates to a method of producing reactive silicon group-containing polyether oligomers which comprises reacting (a) a polyether oligomer whose main chain is a polyether and which contains, in each molecule, at least one unsaturated group represented by the general formula (1):

$$H_2C=C(R^1)-R^2-O- \tag{1}$$

(in the formula, $R^1$ is a hydrocarbon group containing not more than 10 carbon atoms and $R^2$ is a divalent organic group containing 1 to 20 carbon atoms and one or more species selected from the group consisting of hydrogen, oxygen and nitrogen atoms as a constituent atom) or the general formula (2):

$$HC(R^1)=CH—R^2—O— \qquad (2)$$

(in the formula, $R^1$ is a hydrocarbon group containing not more than 10 carbon atoms and $R^2$ is a divalent organic group containing 1 to 20 carbon atoms and one or more species selected from the group consisting of hydrogen, oxygen and nitrogen atoms as a constituent atom) on a side chain or at a terminus with (b) a reactive silicon group-containing compound in the presence of (c) a group VIII transition metal catalyst to introduce the reactive silicon group into said polyether oligomer (a), wherein the reaction is carried out in the presence of (d) a sulfur compound.

In a preferred mode of embodiment, the present invention relates to the method of producing reactive silicon group-containing polyether oligomers, wherein said reactive silicon group-containing compound is a compound represented by the general formula (3):

$$H—(Si(R^3_{2-b})(X_b)O)_m Si(R^4_{3-a})Xa \qquad (3)$$

(in the formula, $R^3$ and $R^4$ are the same or different and each independently represents an alkyl group containing 1 to 20 carbon atoms, an aryl group containing 6 to 20 carbon atoms, an aralkyl group containing 7 to 20 carbon atoms or a triorganosiloxy group represented by $(R')_3SiO—$, R' is a monovalent hydrocarbon group containing 1 to 20 carbon atoms and the three R' groups may be the same or different, and when there are a plurality of $R^3$ and/or $R^4$ groups, they may be the same or different; X represents a hydroxyl group or a hydrolyzable group and, when there are a plurality of X groups, they may be the same or different; a represents 0, 1, 2 or 3; b represents 0, 1 or 2 and the b's in the m of $—Si(R^3_{2-b})(X_b)—O—$ groups maybe the same or different; and m represents an integer of 0 to 19 with the condition that the sum $a+\Sigma b$ is not less than 1, namely $a+\Sigma b \geq 1$)

In another preferred mode of embodiment, the present invention relates to the method of producing reactive silicon group-containing polyether oligomers, wherein said group VIII transition metal catalyst (c) comprises at least one member of the group consisting of platinum-vinylsiloxane complexes and platinum-olefin complexes.

In a further preferred mode of embodiment, the present invention relates to the method of producing reactive silicon group-conLaining polyether oligomers, wherein said unsaturated group-containing polyether oligomer, namely component (a), is derived from a polyether oligomer produced by ring-opening addition polymerization of an alkylene oxide in the presence of a double metal cyanide complex catalyst.

In a further preferred mode of embodiment, the present invention relates to the method of producing reactive silicon group-containing polyether oligomers, wherein the main chain mainly comprises polypropylene oxide.

In a further preferred mode of embodiment, the present invention relates to the method of producing reactive silicon group-containing polyether oligomers, wherein, in the general formula (1) or (2), $R^1$ is $CH_3$ or $CH_2CH_3$.

In a further preferred mode of embodiment, the present invention relates to the method of producing reactive silicon group-containing polyether oligomers, wherein the unsaturated group is represented by the formula (4):

$$H_2C=C(CH_3)—CH_2—O— \qquad (4).$$

In a further preferred mode of embodiment, the present invention relates to the method of producing reactive silicon group-containing polyether oligomers, wherein the unsaturated group is represented by the formula (5):

$$HC(CH_3)=CH—CH_2—O— \qquad (5).$$

The second aspect of the present invention provides a reactive silicon group-containing polyether oligomer, wherein the reactive silicon group occurs only at termini of the molecular chain and the reactive silicon group introduction percentage relative to each molecular chain terminus is, on average, not less than 85%.

In a preferred mode of embodiment, the present invention relates to a reactive silicon group-containing polyether oligomer as produced by the method described hereinabove.

In a further preferred mode of embodiment, the present invention relates a reactive silicon group-containing polyether oligomer, wherein an average reactive silicon group introduction percentage is not less than 85% relative to each molecular chain terminus, and the reactive silicon group occurs only at termini of the molecular chain and the termini are represented by the formula:

$$(CH_3O)_2Si(CH_3)—CH_2—CH(CH_3)—CH_2—O—.$$

In a further preferred mode of embodiment, the present invention relates to the reactive silicon group-containing polyether oligomer which has a number average molecular weight higher than 10,000 (Mn>10,000).

DETAILED DESCRIPTION OF THE INVENTION

In the following, the present invention is described in more detail. The unsaturated group-containing polyether oligomer, component (a), to be used in the practice of the present invention may be any of polyether oligomers whose main chain comprises a polyether and which contains, in each molecule, at least one unsaturated group represented by the general formula (1):

$$H_2C=C(R^1)—R^2—O— \qquad (1)$$

(in the formula, $R^1$ is a hydrocarbon group containing not more than 10 carbon atoms and $R^2$ is a divalent organic group containing 1 to 20 carbon atoms and one or more species selected from the group consisting of hydrogen, oxygen and nitrogen atoms as a constituent atom), or the general formula (2):

$$HC(R^1)=CH—R^2—O— \qquad (2)$$

(in the formula, $R^1$ is a hydrocarbon group containing not more than 10 carbon atoms and $R^2$ is a divalent organic group containing 1 to 20 carbon atoms and one or more species selected from the group consisting of hydrogen, oxygen and nitrogen atoms as a constituent atom, on a side chain or at a terminus. As $R^1$, there may be mentioned, among others, straight-chain alkyl groups, such as methyl, ethyl, propyl, butyl, pentyl, hexyl, heptyl, octyl, nonyl and decyl, branched alkyl groups such as isopropyl, isobutyl, isopentyl and isohexyl, and aryl groups such as phenyl. $R^1$ may comprise one single species or a mixture of two or more species. From the reactivity viewpoint, however, it is preferred that $R^1$ be $CH_3$— or $CH_3CH_2$—, in particular $CH_3$—. $R^2$ is a divalent organic group containing 1 to 20 carbon atoms and one or more species selected from the group consisting of hydrogen, oxygen and nitrogen atoms as a constituent atom. Examples are —$CH_2$—, —$C_2H_4$—, —$C_3H_6$—, —$C_4H_8$—, —$C_5H_{10}$—, —$C_6H_4$—, —$C_6H_{12}$—, —$C_7H_{14}$—, —$C_8H_{16}$—, —$C_9H_{18}$—, —$C_{10}H_{20}$—, —CH(CH$_3$) —, —CH$_2$—CH (CH$_3$) —, —CH$_2$—CH(CH$_3$)—CH$_2$—, —C$_2$H$_4$—CH(CH$_3$)—, —CH$_2$—C$_6$H$_4$—, —CH$_2$—C$_6$H$_4$—CH$_2$—, —C$_2$H$_4$—C$_6$H$_4$—, etc. From the ease of synthesis viewpoint, —CH$_2$—, —C$_2$H$_4$— and —CH$_2$—CH (CH$_3$)— are preferred. From the viewpoint of ready availability of starting material —CH$_2$— is further preferred. As specific examples of the resulting unsaturated group, there may be mentioned, among others, H$_2$C=C(CH$_3$)—CH$_2$—O—, H$_2$C=C(CH$_2$CH$_3$)—CH$_2$—O—, H$_2$C=C(CH$_2$CH(CH$_3$)$_2$)—CH$_2$—O—, HC(CH$_3$)=CH—CH$_2$—O—, etc. In particular, from the reactivity viewpoint, H$_2$C=C(CH$_3$)—CH$_2$—O—, and HC(CH$_3$)=CH—CH$_2$—O— are preferred and, from the viewpoint of ready availability of starting material and ease of synthesis, H$_2$C=C(CH$_3$)—CH$_2$—O— is particularly preferred.

The molecular weight of the (a) component polyether oligomer is not particularly restricted but it is preferred that the number average molecular weight be 1,000 to 100,000. When the number average molecular weight is lower than 1,000, the cured product from the product reactive silicon group containing polyether oligomer will be brittle or fragile. When it exceeds 100,000, the functional group concentration becomes excessively low and the rate of curing lowers and, further, the polymer viscosity becomes too high, rendering the polymer difficult to handle. From the mechanical properties viewpoint, the number average molecular weight should preferably within the range of 10,000 to 50,000.

The term "number average molecular weight" as used herein is defined as the number average molecular weight determined by directly measuring the terminal group concentrations by titration analyses based on the principles of the hydroxyl value determination according to JIS K 1557 and the iodine value determination according to JIS K 0070 and considering the structure of the polyether oligomer in question. It is also possible to determine the number average molecular weight by a relative method which comprises constructing a working curve for the polystyrene equivalent molecular weight determined by conventional GPC measurement and the terminal group-based molecular weight mentioned above and converting the GPC-based molecular weight to the terminal group-based molecular weight.

The main chain structure of the (a) component polyether oligomer may be any polymer structure containing a structure represented by —R—O— as a repeating unit, wherein R may be a divalent organic group containing 1 to 20 carbon atoms and one or more species selected from the group consisting of hydrogen, oxygen and nitrogen atoms as a constituent atom. Said polymer structure may comprise a homopolymer structure composed of one and the same repeating unit or a copolymer structure composed of two or more repeating units. Further, the main chain structure may have a branched structure. As the component (a) to be used in the practice of the present invention, those hydroxyl-containing polyethers obtainable by various methods, for example the method mentioned below can be used.

For preparing the (a) component to be used in the practice of the present invention, use maybe made of apolyether obtained by subjecting a substituted or unsubstituted epoxy compound containing 2 to 12 carbon atoms, such as an alkylene oxide, specifically ethylene oxide, propylene oxide, α-butylene oxide, β-butyiene oxide, hexene oxide, cyclohexene oxide, styrene oxide ora-methylstyrene oxide, or an alkyl, allyl or aryl glycidyl ether, specifically methyl glycidyl ether, ethyl glycidyl ether, isopropyl glycidyl ether, butyl glycidyl ether, allyl glycidyl ether or phenyl glycidyl ether, to ring opening polymerization using, as the initiator, a dihydric or polyhydric alcohol or an appropriate hydroxyl-containing oligomer, such as ethylene glycol, propylene glycol, butanediol, hexamethylene glycol, methallyl alcohol, hydrogenated bisphenol A, neopentyl glycol, polybutadienediol, diethylene glycol, triethylene glycol, polyethylene glycol, polypropylene glycol, polypropylene triol, polypropylene tetraol, dipropylene glycol, glycerol, trimethylolmethane, trimethylolpropane or pentaerythritol, in the presence of an appropriate catalyst. The catalyst for said polymerization may be such known one as an alkali catalyst such as KOH or NaOH, an acidic catalyst such as trifluoroborane-etherate, an aluminoporphyrin metal complex, or a double metal cyanide complex catalyst such as zinc cobalt cyanide-glyme cmplex. The use of a double metal cyanide complex catalyst is preferred since, then, the side reaction occurs scarcely, although any other appropriate one may be used.

The method of producing such (a) component by introducing an unsaturated group into a hydroxyl-terminated polyether cligomer may be any appropriate one known in the art, for example the method comprising reacting the hydroxyl-terminated polyether oligomer with an unsaturated bond-containing compound to thereby introduce the unsaturated bond via ether, ester, urethane or carbonate bonding, for instance. For introducing an unsaturated bond via ether bonding, for instance, the hydroxyl terminal of the polyether oligomer is converted to a metaloxy group, namely —OM (M being Na or K) and then the metaloxy compound is reacted with an organic halogen compound represented by the general formula (6):

(in the formula, $R^1$ is a hydrocarbon group containing not more than 10 carbon atoms and $R^2$ is a divalent organic group containing 1 to 20 carbon atoms and one or more species selected from the group consisting of hydrogen, oxygen and nitrogen atoms as a constituent atom and X is a halogen atom), or the general formula (7):

(in the formula, $R^1$ is a hydrocarbon group containing not more than 10 carbon atoms and $R^2$ is a divalent organic group containing 1 to 20 carbon atoms and one or more species selected from the group consisting of hydrogen, oxygen and nitrogen atoms as a constituent atom and X is a halogen atom) to give an unsaturated group-terminated polyether.

The reactive silicon group as so referred to herein is not particularly restricted but typically includes groups represented by the general formula (8):

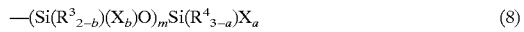

(in the formula, $R^3$ and $R^4$ are the same or different and each independently represents an alkyl group containing 1 to 20 carbon atoms, an aryl group containing 6 to 20 carbon atoms, an aralkyl group containing 7 to 20 carbon atoms or a triorganosiloxy group represented by $(R')_3SiO-$, R' is a monovalent hydrocarbon group containing 1 to 20 carbon atoms and the three R' groups may be the same or different, and when there are a plurality of $R^3$ and/or $R^4$ groups, they may be the same or different; X represents a hydroxyl group or a hydrolyzable group and, when there are a plurality of X groups, they may be the same or different; a represents 0, 1, 2 or 3; b represents 0, 1 or 2; the b's in the m of $-Si(R^3_{2-b})(X_b)-O-$ groups may be the same or different; and m represents an integer of 0 to 19 with the condition that the sum a+Σb is not less than 1, namely a+Σb≧1).

Among the groups represented by X, the hydrolyzable group is not particularly restricted but may be any hydrolyzable group known in the art. As specific examples, there may be mentioned, hydrogen atom, halogen atoms, alkoxy groups, acyloxy groups, ketoxymate groups, amino group, amide group, acid amide groups, aminoxy group, mercapto group, alkenyloxy groups, etc. Among these, alkoxy groups, such as methoxy, ethoxy, propoxy and isopropoxy, are preferred, since they are mildly hydrolyzable and easy to handle.

One to three such hydroxyl and/or hydrolyzable groups may be bound to one silicon atom and the sum (a+Σb) is preferably within the range of 1 to 5. In cases where there are two or more hydroxyl and/or hydrolyzable groups in each reactive silicon group, they may be the same or different.

The number of silicon atoms in the reactive silicon group may be one or two or more. In the case of a reactive silicon group having a silicon atom bound via siloxane bonding, for instance, said number may be about 20.

From the ready availability viewpoint, those reactive silicon groups which are represented by the following general formula (9):

$$-Si(R^4_{3-a})X_a \qquad (9)$$

(in the formula, $R^4$, X and a are as defined above), are preferred.

As specific examples of $R^3$ and $R^4$ in the above general formula (8), there may be mentioned alkyl groups such as methyl and ethyl, cycloalkyl groups such as cyclohexyl, aryl groups such as phenyl, aralkyl groups such as benzyl, triorganosiloxy groups represented by $(R')_3SiO-$ (in which R' is, for example, methyl or phenyl) and the like. Methyl is particularly preferred as $R^3$, $R^4$ and R'.

The reactive silicon group-containing compound as so referred to herein may be any compound having, within the molecule thereof, at least one silicon atom bound to a hydroxyl group and/or hydrolyzable group, as mentioned above, and at least one Si—H bond. Typical examples are compounds represented by the following general formula (3):

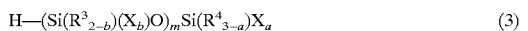

$$H-(Si(R^3_{2-b})(X_b)O)_mSi(R^4_{3-a})X_a \qquad (3)$$

(in the formula, $R^3$, $R^4$, X, a, b and m are as defined above in relation to the above general formula (8)).

Specifically, there may be mentioned halogenated silanes such as trichlorosilane, methyldichlorosilane, dimethylchlorosilane, phenyldichlorosilane, trimethylsiloxymethylchlorosilane and 1,1,3,3-tetramethyl-1-bromodisiloxane; alkoxysilanes such as trimethoxysilane, triethoxysilane, methyldiethoxysilane, methyldimethoxysilane, phenyldimethoxysilane, trimethylsiloxymethylmethoxysilane and trimethylsiloxydiethoxysilane; acyloxysilanes such as methyldiacetoxysilane, phenyldiacetoxysilane, triacetoxysilane, trimethylsiloxymethylacetoxysilane and trimethylsiloxydiacetoxysiiane; ketoximatosilanes such as bis(dimethylketoximato) methylsiloxysilane, bis(cyclohexylketoximato) methylsilane, bis(diethylketoximato)trimethylsilane, bis (methylethylketoximato)methylsilane and tris(acetoximato) silane; alkenyloxysilanes such as methylisopropenyloxysilane; and the like. Among these, alkoxysilanes are preferred and, as the alkoxy group, methoxy is particularly preferred.

In the practice of the present invention, the hydrolyzable group X in the terminal silyl group obtained in the above manner may be further converted to another hydrolyzable group Y. In particular when X is a halogen atom, a hydrogen halide, which has an irritating odor, is generated in the step of curing with water and, therefore, it is preferred that the halogen atom be converted to another hydrolyzable group. As the hydrolyzable functional group suited for substitution, there may be mentioned alkoxy groups, acyloxy groups, ketoximate groups, amide group, acid amide groups, aminoxy group, mercapto group and the like. Various methods may be used for converting a halogen function to one of such hydrolyzable groups. For converting to alkoxy groups, for instance, there may specifically be mentioned the method comprising reacting the halogen function with ① an alcohol or phenol, such as methanol, ethanol, 2-methoxyethanol, sec-butanol, tert-butanol or phenol, ② a sodium, potassium, lithium or like metal alkoxide derived from an alcohol or phenol, ③ an orthoformate such as methyl orthoformate or ethyl orthoformate or ④ an epoxy compound such as ethylene oxide, propylene oxide or allyl glycidyl ether, for instance. In particular, the use of a reaction system comprising a combination of ① an alcohol or phenol and ③ an orthoformate or a combination of ① an alcohol or phenol and ④ an epoxy compound gives favorable results. Similarly, for converting to an acyloxy group, there may specifically be mentioned the method comprising reacting the halogen function with ① a carboxylic acid such as acetic acid and propionic acid or ② an acid anhydride such as acetic anhydride or ③ the sodium, potassium or lithium salt of a carboxylic acid, for instance. Similarly, for converting to an aminoxy group, there may specifically be mentioned the method comprising reacting the halogen function with ① a hydroxylamine such as N,N-dimethylhydroxylamine, N,N-diethylhydroxylamine. N,N-methylphenylhydroxylamine or N-hydroxylpyrrolidine or ② the sodium, potassium or lithium salt of a hydroxylamine, for instance. Similarly. for converting to an amide group, there may specifically be mentioned the method comprising reacting the halogen function with ① a primary or seconday amine such as N,N-dimethylamine. N,N-diethylamine, N-methylphenylamine or pyrrolidine or ② the sodium, potassium or lithium salt of a primary or secondary amine, for instance. Similarly, for converting to an acid amide group, there may specifically be mentioned the method comprising reacting the halogen function with ① an acid amide having at least one hydrogen atom on the nitrogen atom, such as acetamlde, formamide or proplonamide or ② the sodium, potassium or lithium salt of such an acid amide, for instance. When a reaction system comprising a combination of a ketoxime such as acetoxime and methyl ethyl ketoxime or a mercaptan such as N-octylmercaptan, and tert-butylmercaptan with an orthoformate or an epoxy compound, the halogen function can be converted partly to the corresponding ketoximate or mercapto group, respectively, with the remaining portion being converted to the alkoxy group derived from the orthoformate or epoxy compound, respectively. Not only the halogen function mentioned above but also any other hydrolyzable functional group may be converted to some other hydrolyzable functional groups to be used.

As for the group VIII transition metal catalyst, a metal complex catalyst derived from a group VIII transition metal selected from among platinum, rhodium, cobalt, palladium, nickel and the like is efficiently be used. For instance, such compounds as $H_2PtCl_6 \cdot 6H_2O$, platinum-vinylsiloxane complexes, platinum-olefin complexes, Pt metal, RhCl $(PPh_3)_3$, $RhCl_3$, $Rh/Al_2O_3$, $RuCl_3$, $IrCl_3$, $FeCl_3$, $AlCl_3$, $PdCl_2 \cdot 2H_2O$, $NiCl_2$ and $TiCl_4$ can be used. From the hydrosilylation reactivity viewpoint, platinum-vinylsiloxane complexes or platinum-olefin complexes are particularly preferred. The "platinum-vinylsiloxane complexes" as so referred to herein collectively refer to compounds in which a siloxane, polysiloxane or cyclic siloxane having a vinyl group within the molecule is coordinated, as a ligand, with a platinum atom. As specific examples of such ligand, there may be mentioned 1,1,3,3-tetramethyl-1,3-divinyldisiloxane and 1,3,5,7-tetramethyl-1,3,5,7-tetravinylcyclotetrasiloxane, among others. As specific examples of the olefin ligand in said platinum-olefin complexes, there may be mentioned 1,5-hexadiene, 1,7-octadiene, 1,9-decadiene, 1,11-dodecadiene and 1,5-cyclooctadiene, among others. Among them, 1,9-decadiene is particularly preferred.

Such platinum-vinylsiloxane complexes and platinum-olefin complexes are disclosed in Japanese Kokoku Publication Hei-8-9006.

The addition amount of the catalyst is not particularly restricted but it is generally preferred that the platinum catalyst be used in an amount of $10^{-1}$ to $10^{-8}$ mole, more preferably $10^{-3}$ to $10^{-5}$ mole, per mole of the alkenyl group. When the catalyst amount is too small, the hydrosilylation reaction may not proceed successfully. Conversely when the catalyst amount is excessive, the cost increase may result due to catalyst consumption or the residual catalyst amount in the product may increase, for instance.

In practicing the production method of the present invention, it is generally preferred that the hydrosilylation reaction be carried out at a temperature of 10 to 150° C., more preferably 20 to 120° C., still more preferably 40 to 100° C. If need arise for the adjustment of reaction temperature and/or reaction system viscosity, for instance, a solvent such as benzene, toluene, xylene, tetrahydrofuran, methylene chloride, pentane, hexane or heptane may be used. In particular when a high-molecular compound is to be hydrosilylated, the use of such a solvent is preferred for attaining a liquid system or decreasing the viscosity. It is also possible to use, as the solvent, a plasticizer which is to be added in producing formulations containing high-molecular compounds.

In carrying out the hydrosilylation reaction according to the production method of the present invention, the gaseous phase in the reactor for hydrosilylation may comprise an inert gas (e.g. nitrogen, helium) alone or contain oxygen therein. The hydrosilylation reaction in general is often carried out in the presence of an inert gas such as nitrogen or helium in the gaseous phase in the reactor from the viewpoint of safety in handling combustible substances. When, however, the reaction is carried out in the presence of an inert gas such as nitrogen or helium, the rate of reaction may sometimes decrease depending on the hydrosilylation reaction conditions.

The hydrosilylation reaction according to the production method of the present invention can be promoted safely in the presence of oxygen by adjusting the oxygen concentration in the gaseous phase in the reactor to a level such that explosive mixture formation can be avoided. Thus, the oxygen concentration in the gaseous phase in the reactor can be, for example, 0.5 to 10%.

Furthermore, the hydrosilylation reaction may be carried out in the presence of an antioxidant so that the polyether oligomer, reaction solvent and/or plasticizer in the reaction system are prevented from being oxidized during the reaction. Useful antioxidants include, but are not limited to, phenolic antioxidants capable of functioning as radical chain inhibitors, for example 2,6-di-tert-butyl-p-cresol, 2,6-di-tert-butylphenol, 2,4-dimethyl-6-tert-butylphenol, 2,2'-methylenebis(4-methyl-6-tert-butylphenol), 4,4'-butylidenebis(3-methyl-6-tert-butylphenol), 4,4'-thiobis(3-methyl-6-tert-butylphenol), tetrakis[methylene-3-(3,5-di-tert-butyl-4-hydroxyphenyl)propionato]methane, 1,1,3-tris (2-methyl-4-hydroxy-5-tert-butylphenyl)butane and the like, and amine type antioxidants likewise serving as radical chain inhibitors, for example phenyl-β-naphthylamine, α-naphthylamine, N,N'-di-sec-butyl-p-phenylenediamine, phenothiazine, N,N'-diphenyl-p-phenylenediamine and the like.

For the hydrosilylation reaction in the production method of the present invention, the addition of a sulfur compound is essential. Said sulfur compound includes, but is not limited to, elementary sulfur, thiols, sulfides, sulfoxides, sulfones and thioketones. Sulfur is particularly preferred among them. For adding a sulfur compound to the liquid reaction system, it is possible, for instance, to dissolve the sulfur compound in a part of the reaction mixture or solvent beforehand and then to add the solution to the reaction system to attain totally uniform dispersion. For example, it is possible to dissolve the sulfur compound in an organic solvent such as toluene, hexane or xylene and then to add to the reaction system.

The addition amount of the sulfur compound can be determined, for example, within a range such that the amount thereof is 0.1 to 10 times the amount, expressed in terms of number of moles, of the metal catalyst, or $10^{-3}$ to $10^{-6}$ times the amount, expressed in terms of number of moles, of the alkenyl group, or 0.001 to 10 ppm based on the whole reaction mixture weight. When the addition amount is too low, the effects of the present invention may not be fully produced. When the amount of the sulfur compound is excessive, the catalytic activity may be decreased or the reaction is interfered, for instance. Therefore, an adequate addition amount should preferably be selected.

By the production method of the present invention, it is possible to obtain a polyether oligomer containing at least one reactive silicon group mentioned above on a side chain or at a molecular chain terminal.

By the production method of the present invention, it is possible to obtain such polyether oligomer with a high reactive silicon group introduction percentage efficiently within a short period of time while the internal rearrangement of the unsaturated group during the hydrosilylation reaction is prevented. The addition of a sulfur compound makes it possible to curtail the production time, reduce the cost of production and further contribute to productivity improvement without causing any cost increase due to the use of an expensive platinum catalyst otherwise in an increased amount or raising a problem concerning the removal of catalyst residues, for instance.

The content of the reactive silicon group of the thus-synthesized reactive silicon group-containing polyether oligomer is preferably such that said group occurs at least in a proportion of 0.1, on average for each molecular chain terminus of the polyether oligomer and, from the curability viewpoint, it is preferred that said proportion be 0.5 to 5, more preferably 0.8 to 2. For obtaining cured products showing a good rubber elasticity behavior, it is preferred that said proportion be 0.9 to 1. When the number of reactive silicon groups contained in each polymer molecule is less than 1, the curability tends to be insufficient and it becomes difficult to attain a good rubber elasticity.

The silylation rate may be determined by various methods. At the present, it is considered that the measurement method by means of NMR can give accurate values. The silyl group introduction percentage can be obtained by calculating the ratio between the number of termini having the reactive silicon group introduced as determined by NMR and the number of termini having no silyl group.

The reactive silicon group introduction percentage, relative to each molecular chain terminus, of the reactive silicon group-containing polyether oligomer is not less than 85% on average. For attaining better physical properties, however, it is preferred that said percentage be not less than 90%.

The thus-synthesized reactive silicon group-containing polyether oligomer can be cured with moisture in the atmosphere in the presence of a curing catalyst to give coatings having good adhesiveness to metals, glass and the like and thus is useful as a coating composition for buildings, airplanes, automobiles and the like, a sealing composition, a paint composition, or an adhesive composition. As the curing catalyst, any of those known silanol condensation catalysts can be used. These catalysts may be used singly or two or more of them may be used combinedly.

It is possible to incorporate various additives, for example plasticizers, fillers, tackifiers such as aminosilanes and dehydrating agents, if necessary, into the reactive silicon group-containing polyether oligomer of the present invention.

BEST MODES FOR CARRYING OUT THE INVENTION

The following typical examples further illustrate the present invention. They are, however, by no means limitative of the scope of the present invention.

EXAMPLE 1

A 50-mL three-necked eggplant-shaped flask equipped with a reflux condenser was charged with 2 g of methallyl-terminated polypropylene oxide with a molecular weight of 2,000 and 1 g of hexane, and azeotropic dehydration was carried out at 90° C. After distilling off the hexane under reduced pressure, the flask was purged with nitrogen and 12 µL of platinum vinyl catalyst (0.3% by weight (as platinum) solution in xylene) was added thereto. Nitrogen gas containing 6% by volume of oxygen was charged into the gaseous phase portion in the reactor under atmospheric pressure. While stirring with a magnetic stirrer, 10 mg of 2,6-di-tert-butyl-p-cresol (as antioxidant) and 6 µL of sulfur (0.1% by weight solution in toluene) were added and 0.34 g of DMS (dimethoxymethylsilane) was gradually added dropwise. While continuing heating of the mixed solution at 90° C., the progress of the reaction was followed. After 2 hours of reaction, the unreacted DMS was distilled off under reduced pressure. $^1$H-NMR analysis of the reaction product revealed that the ratio between terminally introduced dimethoxymethylsilyl and byproduct isopropenyl (formed by isomerization of alkenyl) was 99:1 and that the dimethoxymethylsilyl group introduction percentage was 90%.

EXAMPLE 2

Polypropylene oxide with a molecular weight of 2,000 was prepared by polymerizing propylene oxide using dipropylene glycol as an initiator and zinc hexacyanocobaltate-glyme complex as a catalyst. Then, a methanol solution of 1.2 equivalents, relative to the hydroxyl group of that hydroxyl-terminated polyether oligomer, of NaOMe was added to said oligomer and the methanol was then distilled off. By adding 3-chloro-2-methyl-1-propene, the terminal hydroxyl was converted to methallyl. Then, by following the procedure of Example 1, terminal methallyl group was converted to dimethoxymethylsilyl group to give the corresponding oligomer. $^1$H-NMR analysis of the reaction product revealed that the ratio between terminally introduced dimethoxymethylsilyl and byproduct isopropenyl was 99:1 and that the dimethoxymethylsilyl group introduction percentage was 97%.

EXAMPLE 3

A hydroxyl-terminated polyether oligomer with a molecular weight of 10,000 was prepared by polymerizing propylene oxide using polypropylene glycol as an initiator and zinc hexacyanocobaltate-glyme complex as a catalyst. Then, a methanol solution of 1.2 equivalents, relative to the hydroxyl group of that hydroxyl-terminated polyether oligomer, of NaOMe was added to said oligomer and the methanol was then distilled off. By further adding 3-chloro-2-methyl-1-propene, the terminal hydroxyl was converted to methallyl. Then, 10 g of hexane was added to 100 g of the oligomer obtained and azeotropic dehydration was carried out at 90° C. After distilling off the hexane under reduced pressure and purging with nitrogen, 11 µL of platinum vinyl catalyst (3% by weight (as platinum) solution in xylene) was added and nitrogen gas containing 6% by volume of oxygen was charged into the gaseous phase portion in thereactorunderatmosphericpressure. Whilestirringwith a magnetic stirrer, 0.5 g of 2,6-di-tert-butyl-p-cresol (as antioxidant) and 55 µL of sulfur (1% by weight solution in toluene) were added and 5 g of DMS was gradually added dropwise. While continuing heating of the mixed solution at 90° C., the progress of the reaction was followed. After 6 hours of reaction, the dimethoxymethylsilyl group introduction percentage reached 97%. Thereafter, the unreacted DMS was distilled off under reduced pressure. $^1$H-NMR analysis of the reaction product revealed that the ratio between terminally introduced dimethoxymethylsilyl and byproduct propenyl was 98:2.

EXAMPLE 4

A hydroxyl-terminated polyether oligomer with a molecular weight of 20,000 was prepared by polymerizing propylene oxide using polypropylene glycol as an initiator and zinc hexacyanocobaltate-glyme complex as a catalyst. Then, a methanol solution of 1.2 equivalents, relative to the hydroxyl group of that hydroxyl-terminated polyether oligomer, of NaOMe was added to said oligomer and the methanol was then distilled off. By further adding 3-chloro-2-methyl-1-propene, the terminal hydroxyl was converted to methallyl. Then, 10 g of hexane was added to 100 g of the oligomer obtained and azeotropic dehydration was carried out at 90° C. After distilling off the hexane under reduced pressure and purging with nitrogen, 11 µL of platinum vinyl catalyst (3% by weight (as platinum) solution in xylene) was added and nitrogen gas containing 6% by volume of oxygen was charged into the gaseous phase portion in the reactor under atmospheric pressure. While stirring with a magnetic stirrer, 0.5 g of 2,6-di-tert-butyl-p-cresol (as antioxidant) and 55 μL of sulfur (0.1% by weight solution in toluene) were added and 2.5 g of DMS was gradually added dropwise. While continuing heating of the mixed solution at 90° C., the progress of the reaction was followed. After 6 hours of reaction, the dimethoxymethylsilyl group introduction percentage reached 97%. Thereafter, the unreacted DMS was distilled off under reduced pressure. $^1$H-NMR analysis of the reaction product revealed that the ratio between terminally introduced dimethoxymethylsilyl and byproduct propenyl was 98:2.

Comparative Example 1

A hydroxyl-terminated polyether oligomer with a number average molecular weight of about 10,000 was prepared by polymerizing propylene oxide using polypropylene glycol as an initiator and zinc hexacyanocobaltate-glyme complex as a catalyst. Then, a methanol solution of 1.2 equivalents, relative to the hydroxyl group of that hydroxyl-terminated polyether oligomer, of NaOMe was added to said oligomer and the methanol was then distilled off. By further adding 3-chloro-2-methyl-1-propene, the terminal hydroxyl was converted to methallyl. Then, 10 g of hexane was added to 100 g of the oligomer obtained and azeotropic dehydration was carried out at 90° C. After distilling off the hexane under reduced pressure and purging with nitrogen, 11 μL of platinum vinyl catalyst (3% by weight (as platinum) solution in xylene) was added and, while stirring with a magnetic stirrer, 5 g of DMS was gradually added dropwise. While continuing heating of the mixed solution at 90° C., the progress of the reaction was followed. As a result, after 6 hours of reaction, the dimethoxymethylsilyl group introduction percentage was 50%. Thereafter, the unreacted DMS was distilled off under reduced pressure. $^1$H-NMR analysis of the reaction product revealed that the ratio between terminally introduced dimethoxymethylsilyl and byproduct propenyl was 98:2.

Comparative Example 2

A hydroxyl-terminated polyether oligomer with a number average molecular weight of about 20,000 was prepared by polymerizing propylene oxide using polypropylene glycol as an initiator and zinc hexacyanocobaltate-glyme complex as a catalyst. Then, a methanol solution of 1.2 equivalents, relative to the hydroxyl group of that hydroxyl-terminated polyether oligomer, of NaOMe was added to said oligomer and the methanol was then distilled off. By further adding 3-chloro-2-methyl-1-propene, the terminal hydroxyl was converted to methallyl. Then, 10 g of hexane was added to 100 g of the oligomer obtained and azeotropic dehydration was carried out at 90° C. After distilling off the hexane under reduced pressure and purging with nitrogen, 11 μL of platinum vinyl catalyst (3% by weight (as platinum) solution in xylene) was added and, while stirring with a magnetic stirrer, 2.5 g of DMS was gradually added dropwise. While continuing heating of the mixed solution at 90° C., the progress of the reaction was followed. As a result, after 6 hours of reaction, the dimethoxymethylsilyl group introduction percentage was 40%. Thereafter, the unreacted DMS was distilled off under reduced pressure. $^1$H-NMR analysis of the reaction product revealed that the ratio between terminally introduced dimethoxymethylsilyl and byproduct propenyl was 98:2.

By the production method of the present invention, it is possible to produce a polyether oligomer with a high reactive silicon group introduction efficiently within a short period of time while the internal rearrangement of the unsaturated group during hydrosilylation is suppressed. The production method of the present invention makes it possible to curtail the production time, reduce the cost of production and further contribute to productivity improvement without causing any cost increase due to the use of an expensive platinum catalyst or raising a problem concerning the removal of catalyst residues, for instance.

What is claimed is:

1. A method of producing reactive silicon group-containing polyether oligomers which comprises reacting
    (a) a polyether oligomer whose main chain is a polyether and which contains, in each molecule, at least one unsaturated group represented by the general formula (1):

$$H_2C=C(R^1)-R^2-O- \quad (1)$$

(in the formula, $R^1$ is a hydrocarbon group containing not more than 10 carbon atoms and $R^2$ is a divalent organic group containing 1 to 20 carbon atoms and one or more species selected from the group consisting of hydrogen, oxygen and nitrogen atoms as a constituent atom) or the general formula (2):

$$HC(R^1)=CH-R^2-O- \quad (2)$$

(in the formula, $R^1$ is a hydrocarbon group containing not more than 10 carbon atoms and $R^2$ is a divalent organic group containing 1 to 20 carbon atoms and one or more species selected from the group consisting of hydrogen, oxygen and nitrogen atoms as a constituent atom) on a side chain or at a terminus
    with (b) a reactive silicon group-containing compound in the presence of (c) a group VIII transition metal catalyst to introduce the reactive silicon group into said polyether oligomer (a),
    wherein the reaction is carried out in the presence of (d) a sulfur compound.

2. The method of producing reactive silicon group-containing polyether oligomers according to claim 1,
    wherein said reactive silicon group-containing compound is a compound represented by the general formula (3):

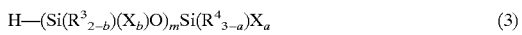
$$H-(Si(R^3_{2-b})(X_b)O)_mSi(R^4_{3-a})X_a \quad (3)$$

(in the formula, $R^3$ and $R^4$ are the same or different and each independently represents an alkyl group containing 1 to 20 carbon atoms, an aryl group containing 6 to 20 carbon atoms, an aralkyl group containing 7 to 20 carbon atoms or a triorganosiloxy group represented by (R')$_3$SiO—, R' is a monovalent hydrocarbon group containing 1 to 20 carbon atoms and the three R' groups may be the same or different, and when there are a plurality of $R^3$ and/or $R^4$ groups, they may be the same or different; X represents a hydroxyl group or a hydrolyzable group and, when there are a plurality of X groups, they may be the same or different; a represents 0, 1, 2 or 3; b represents 0, 1 or 2; the b's in the m of —Si(R$^3_{2-b}$)(X$_b$)—O— groups may be the same or different; and m represents an integer of 0 to 19 with the condition that the sum a+Σb is not less than 1, namely a+Σb≧1).

3. The method of producing reactive silicon group-containing polyether oligomers according to claim 1,
    wherein said group VIII transition metal catalyst (c) comprises at least one member of the group consisting of platinum-vinylsiloxane complexes and platinum-olefin complexes.

4. The method of producing reactive silicon group-containing polyether oligomers according to claim 1, wherein the unsaturated group-containing polyether oligomer, namely component (a), is derived from a polyether oligomer produced by ring-opening addition polymerization of an alkylene oxide in the presence of a double metal cyanide complex catalyst.

5. The method of producing reactive silicon group-containing polyether oligomers according to claim 1,
wherein the main chain mainly comprises polypropylene oxide.

6. The method of producing reactive silicon group-containing polyether oligomers according to claim 1,
wherein, in the general formula (1) or (2), $R^1$ is $CH_3$ or $CH_2CH_3$.

7. The method of producing reactive silicon group-containing polyether oligomers according to claim 1,
wherein the unsaturated group is represented by the formula (4):

(4).

8. The method of producing reactive silicon group-containing polyether oligomers according to claim 1,
wherein the unsaturated group is represented by the formula (5):

(5).

9. A reactive silicon group-containing polyether oligomer as produced by the method according to claim 1.

10. The reactive silicon group-containing polyether oligomer according to claim 9,
wherein the reactive silicon group occurs only at termini of the molecular chain and the reactive silicon group introduction percentage relative to each molecular chain terminus is, on average, not less than 85%.

11. A reactive silicon group-containing polyether oligomer,
wherein an average reactive silicon group introduction percentage is not less than 85% relative to each molecular chain terminus,
and the reactive silicon group occurs only at termini of the molecular chain and the termini are represented by the formula:

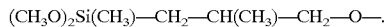

12. The reactive silicon group-containing polyether oligomer according to claim 11 which has a number average molecular weight higher than 10,000 (Mn>10,000).

13. The method of producing reactive silicon group-containing polyether oligomers according to claim 2,
wherein said group VIII transition metal catalyst (c) comprises at least one member of the group consisting of platinum-vinylsiloxane complexes and platinum-olefin complexes.

14. The method of producing reactive silicon group-containing polyether oligomers according to claim 2,
wherein the unsaturated group-containing polyether oligomer, namely component (a), is derived from a polyether oligomer produced by ring-opening addition polymerization of an alkylene oxide in the presence of a double metal cyanide complex catalyst.

15. The method of producing reactive silicon group-containing polyether oligomers according to claim 3,
wherein the unsaturated group-containing polyether oligomer, namely component (a), is derived from a polyether oligomer produced by ring-opening addition polymerization of an alkylene oxide in the presence of a double metal cyanide complex catalyst.

16. The method of producing reactive silicon group-containing polyether oligomers according to claim 2,
wherein the main chain mainly comprises polypropylene oxide.

17. The method of producing reactive silicon group-containing polyether oligomers according to claim 3,
wherein the main chain mainly comprises polypropylene oxide.

18. The method of producing reactive silicon group-containing polyether oligomers according to claim 4,
wherein the main chain mainly comprises polypropylene oxide.

19. The method of producing reactive silicon group-containing polyether oligomers according to claim 2,
wherein, in the general formula (1) or (2), $R^1$ is $CH_3$ or $CH_2CH_3$.

20. The method of producing reactive silicon group-containing polyether oligomers according to claim 3,
wherein, in the general formula (1) or (2), $R^1$ is $CH_3$ or $CH_2CH_3$.

* * * * *